(12) United States Patent
Poirier

(10) Patent No.: US 7,965,734 B2
(45) Date of Patent: Jun. 21, 2011

(54) DEVICE NETWORK INTERFACE

(75) Inventor: Jean-François Poirier, Deux-Montagnes (CA)

(73) Assignee: Paradox Security Systems Ltd., St-Eustache, Quebec (CA)

( * ) Notice: Subject to any disclaimer, the term of this patent is extended or adjusted under 35 U.S.C. 154(b) by 1309 days.

(21) Appl. No.: 11/300,430

(22) Filed: Dec. 15, 2005

(65) Prior Publication Data

US 2007/0140290 A1    Jun. 21, 2007

(51) Int. Cl.
*H04L 12/413* (2006.01)

(52) U.S. Cl. .......................... 370/447; 370/462

(58) Field of Classification Search .......... 370/229–235, 370/431, 445, 447, 461–464
See application file for complete search history.

(56) References Cited

U.S. PATENT DOCUMENTS

| | | | |
|---|---|---|---|
| 4,345,250 A | 8/1982 | Jacobsthal | |
| 4,471,427 A | 9/1984 | Harris | |
| 4,471,481 A | 9/1984 | Shaw et al. | |
| 4,476,467 A | 10/1984 | Terwilliger et al. | |
| 4,493,021 A | 1/1985 | Agrawal et al. | |
| 4,610,010 A | 9/1986 | Claessen et al. | |
| 4,644,348 A | 2/1987 | Gerety | |
| 4,670,872 A | 6/1987 | Cordill | |
| 4,708,082 A | 11/1987 | Ohta et al. | |
| 4,719,223 A | 1/1988 | Kaiser et al. | |
| 4,719,458 A | 1/1988 | Miesterfeld et al. | |
| 5,265,094 A * | 11/1993 | Schmickler et al. | 370/447 |
| 5,377,227 A * | 12/1994 | Hurlbut et al. | 375/142 |
| 5,378,067 A | 1/1995 | Severson et al. | |
| 5,452,422 A * | 9/1995 | Okamoto et al. | 710/113 |
| 6,067,585 A * | 5/2000 | Hoang | 710/11 |
| 6,169,742 B1 * | 1/2001 | Chow et al. | 370/402 |
| 6,601,085 B1 * | 7/2003 | Wertheimer et al. | 709/200 |
| 6,829,249 B1 * | 12/2004 | Ray et al. | 370/466 |
| 6,988,212 B1 * | 1/2006 | Hamdi | 713/310 |
| 7,191,040 B2 * | 3/2007 | Pajakowski et al. | 701/1 |
| 7,215,681 B2 * | 5/2007 | Li | 370/445 |
| 2002/0161912 A1 * | 10/2002 | Vasquez et al. | 709/233 |

\* cited by examiner

*Primary Examiner* — Hassan Kizou
*Assistant Examiner* — Roberta A Shand
(74) *Attorney, Agent, or Firm* — Anglehart et al.

(57) ABSTRACT

The terminal device has a network transceiver and a processor having a first program to cause the processor to transmit a packet of data using the network transceiver in accordance with a data transmission protocol. The first program begins transmission of a packet by sending data to a transmit signal input of the network transceiver in accordance with the protocol. At a circuit level associated with the network transceiver, a received signal in the transceiver is detected at a time of sending data to the transmit signal input. In response to this detection, transmission of the packet is prevented.

21 Claims, 2 Drawing Sheets

DEVICE NETWORK INTERFACE

FIELD OF THE INVENTION

The present invention relates to data network interfaces for devices in which a processor runs communications program modules for handling network communications according to a protocol via a network transceiver.

BACKGROUND OF THE INVENTION

RS-485 along with other protocols allow for devices on a wired or wireless network to communicate with each other using a simple packet structure and protocol. Collision occurs when two devices transmit data at the same time on the same channel. In RS-485, a device decides to transmit only when there is quiet on the network transmission medium. While transmitting a packet, a device records what is received from the transmission medium, and if what is received is not the same as what was transmitted, the device determines that there was collision, and will retransmit the packet.

In many cases, RS-485 and similar protocols are used in applications in which a microcontroller or processor is responsible for transmission of a packet, and the time from detecting quiet on the network to the instant that packet transmission begins is great enough to significantly increase the opportunity for collision on the network. In other words, one device may detect quiet on the network and decide to transmit its data, and before it begins to do so, another device will detect quiet and decide to transmit its packet as well. This leads to collision, and in the case of protocols like RS-485 in which collision detection is performed by analyzing what was received on the network following packet transmission, the time period of a packet is lost before data can be successfully transmitted.

SUMMARY OF THE INVENTION

According to a first object of the present invention, there is provided a method for preventing collision in a terminal device of a data network. The terminal device has a network transceiver and a processor having a first program to cause the processor to transmit a packet of data using the network transceiver in accordance with a data transmission protocol. The data transmission protocol is typically of the type that determines collision by detecting received data during transmission of a packet and by comparing transmitted data to received data following transmission of the packet. If the received data matches the transmitted data, there is no collision, and, if not there is collision. A second program in the processor listens to the data network via the network transceiver to determine, in accordance with the protocol, a time to transmit data. At this time, the first program begins transmission of a packet by sending data to a transmit signal input of the network transceiver in accordance with the protocol. At a circuit level associated with the network transceiver, a received signal in the transceiver is detected at a time of sending data to the transmit signal input. In response to this detection, transmission of the packet is prevented.

In some embodiments of the invention, the detecting and preventing comprise enabling an interrupt in the processor in response to detection of a received signal in the transceiver, wherein the interrupt stops the first program from transmitting when the detection of a received signal in the transceiver occurs before the transmission of the packet. Preferably, the processor responds to the interrupt by checking to see if the first program executed an instruction to begin sending data to the transceiver, and if not, the first program is stopped from sending data. Alternatively, circuitry may be used to disable the interrupt in response to the sending of data to the transmit signal input of the transceiver.

Given that the invention effectively prevents collision, the first program may time, in response to the interrupt, when transmission of the packet should have been completed and then immediately recommence transmission of the packet. This should be when the other terminal device finishes transmitting the packet. Such retransmission can be attempted without using the second program to determine time to transmit, since an error in the assumption that the terminal is free to transmit on the network will not cause collision in accordance with the invention.

According to a second object of the present invention, there is provided a method for network communications in a terminal device having a network transceiver and a processor operating to execute programs in a single tasking manner. The method comprises enabling a receive signal response interrupt in the processor in response to detection of a received signal in the transceiver. The receive signal response interrupt causes essentially immediate execution of a program in the processor to detect and decode an incoming packet. Preferably, the method further comprises causing the processor to enter a sleep mode in which no program instructions are executed, and the receive signal response interrupt causes the processor to exit the sleep mode.

According to a third object of the present invention, there is provided a method for network communications in a terminal device in which a width of a shortest bit of at least one packet received is measured to determine a baud rate for transmission on the network.

The invention is applicable to wired networks as well as wireless networks.

BRIEF DESCRIPTION OF THE DRAWINGS

The invention will be better understood by way of the following detailed description of a preferred embodiment with reference to the appended drawing in which.

DETAILED DESCRIPTION OF THE INVENTION

Figure 1:
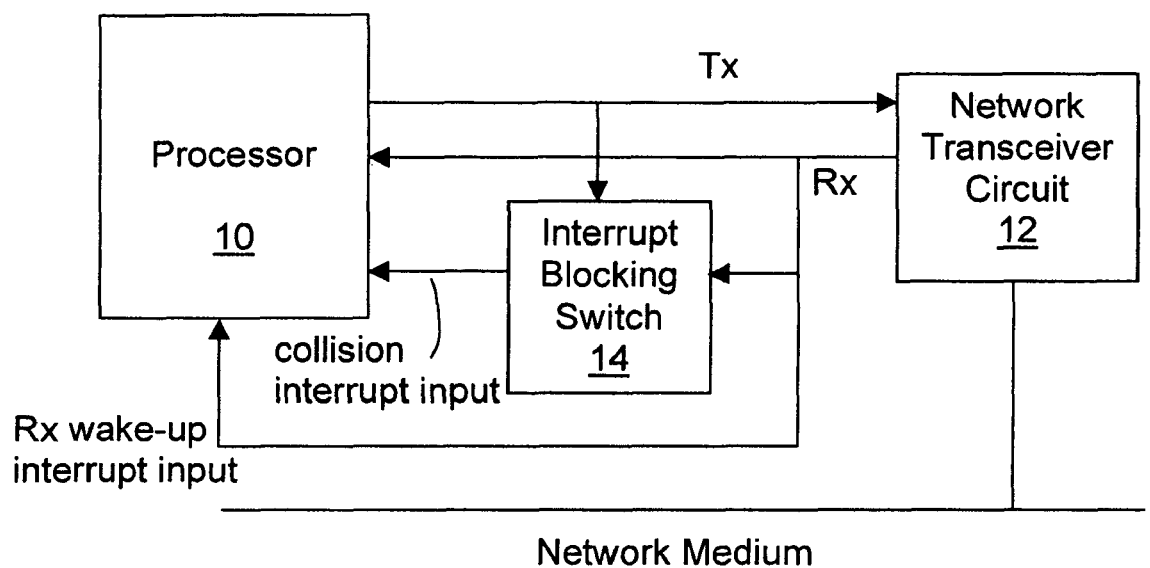
FIG. 1 is a block diagram of a terminal device in accordance with the preferred embodiment.
Figure 2:
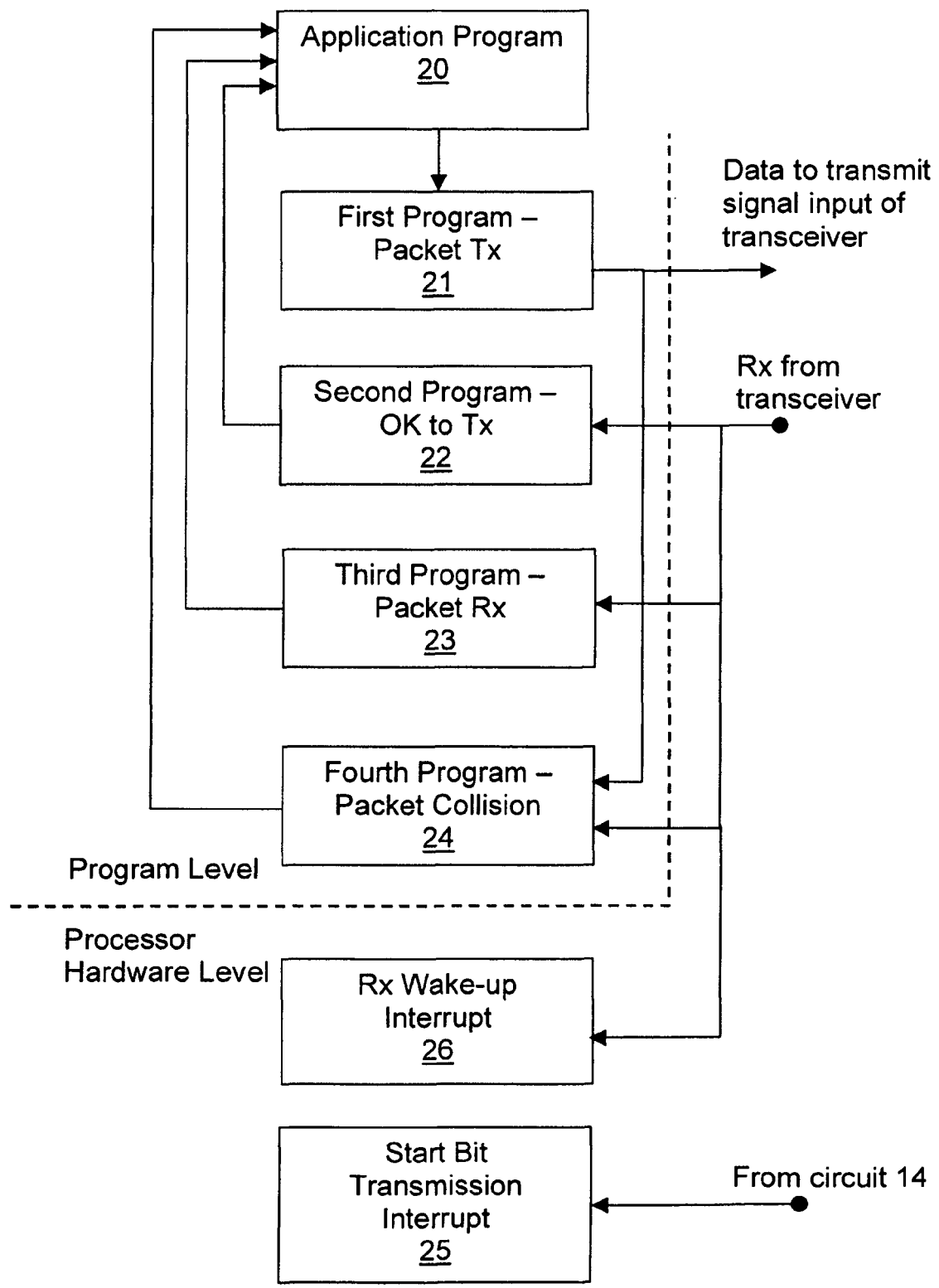
FIG. 2 is a block diagram illustrating program modules within said terminal device processor.

In the preferred embodiment, as illustrated in FIGS. 1 and 2, the terminal device comprises a microprocessor 10 running program code defining the operation of the device. In the preferred embodiment, the processor 10 operates to execute the program code in a sequential instruction, single tasking manner. Within this program code are modules for handling data network communications in accordance with a protocol, and in the preferred embodiment, RS-485 is the chosen protocol. In RS-485, data is transmitted using a simple packet structure of 7 to 10 bits, including typically, a start bit and a stop bit. The modules may comprise a first program 21 for handling the transmission of a packet. This program arranges the start and stop bits, along with the encoding of the payload data into a packet, and sends the bits to the transceiver in the correctly timed sequence. In RS-485, a packet is about 7 to 10 bits long. A second program 22 is used to listen to the network medium via the transceiver to determine if the device may transmit a packet. In the RS-485 protocol, this program waits until a current packet is finished transmitting, and then, if there is no transmission on the medium, it is determined that it is okay to transmit a packet.

A third program 23 is used to receive packets. This program detects via the transceiver all received bits, determines start and stop bits, and decodes packets. A fourth program 24 determines collision. In RS-485, collision is detected by receiving packets even when transmitting, and checking if the received packet is indeed the same as the transmit data. If not, another terminal transmitted at the same time and corrupted the data on the network, and retransmission is required. Program 24 is called by program 21 during transmission to check if what is received is what is being transmitted. The collision detection result may be read by program 20 or alternatively by program 21. The network communications programs are commanded by an application program 20 to perform its required communications tasks.

In the preferred embodiment, collision detection is performed in accordance with the protocol to provide confirmation that no collision took place, however, in addition to collision detection, collision avoidance is performed. As shown in FIGS. 1 and 2, the processor 10 is arranged to use an input pin for a collision interrupt 25 triggered by a signal that is simply the Rx, or received signal from the network transceiver 12. A blocking switch 14 is arranged to prevent the Rx signal from causing an interrupt once the start bit is sent from the processor 10 to the transceiver 12. While in the preferred embodiment, the transceiver 12 is external to the processor 10, it may alternatively be internal to the processor 10. The first program 21 establishes the interrupt 25 within the processor when the first program is executed. The interrupt causes the first program to stop sending bits of the packet, and then to recover as will be described in greater detail below. The first program then sends the start bit of the packet. When the first program determines that the start bit has been sent, it then cancels the interrupt, since at this point, if no interrupt has been triggered, there has been no collision.

It will be appreciated that if program 21 were to attempt to read the Rx value just before sending the start bit of a packet to see if there was going to be collision, program 21 cannot work effectively to prevent collision because of the time delay for processor 10 to implement such instructions. Furthermore, processor 10 may be responsive to interrupts from other input circuits within the terminal device, such as sensors, that will require the processor to execute, albeit briefly, other programs before returning to program 21. This operation is necessary for processor 10 to response to its input devices, however, it makes it even more difficult to attempt to detect start bit collision at the program level. In a multitasking operating system, program 21 may also be delayed in its execution by the processor providing CPU time to other tasks. At the hardware level, however, the response time of circuits 12 and 14, as well as the interrupt 25, are effective to prevent collision of competing start bits.

The use of circuit 14 in conjunction with interrupt 25 is preferred since it prevents the interrupt from being automatically generated with every start bit sent by the terminal when its echo is received back from the network. However, circuit 14 is not essential for preventing this interrupt from occurring. Processor 10 can set the interrupt 25 in a first step, and then in a second step send the start bit. The interrupt will occur no matter whether there is a collision or merely an echo. When the interrupt happens, the processor 10 can look at a register in the processor that indicates the address of the last instruction executed by the processor when the interrupt occurred. If this last address was not the start bit send instruction in program 21, then recovery follows the collision option. If this last address was the start bit send instruction, then the recovery involves disabling the interrupt and continuing with the packet sending. In addition to checking the last executed instruction address to confirm whether the interrupt was triggered before or after sending the start bit, the processor 10 can also check the last process enabled or a flag (bit in a register) that is set with initiation of transmission.

If a collision is detected at the time of sending the start bit, program 21 preferably recovers by jumping to program 23 to receive the packet that was about to collide with the outgoing packet. Once this packet is received, it is possible to allow program 20 to progress knowing there was a collision and a new packet received from the network. However, preferably, the received packet is simply stored in a received packet buffer, and program 21 is caused to continue to attempt to retransmit. Such retransmission attempt can be delayed slightly such that when a terminal is entitled to send multiple packets successively, interrupt 25 will cause program 23 to receive all packets before program 21 successfully gets out its packet.

Alternatively, recovery may involve timing the length of one packet and then immediately attempting to send the start bit again. In a single tasking processor system, waiting within program 21 will result in the received packet being missed since the processor 10 will only receive a packet when program 23 is executed. The application program 20 need not know about the start bit collision and retransmission, and program 24 does not generate any indication of collision. It is of course possible to have the interrupt recovery simply stop packet transmission and trigger an indication of packet collision from program 24, and let the program 20 decide to retransmit when program 22 determines that it is time. While this avoids packet collision, the time to retransmit is lengthened considerably.

It will also be appreciated that start bit collision can be detected and prevented differently than the preferred embodiment, namely without using an interrupt. For example, the transmit data input to the transceiver could be blocked by suitable circuitry if, on the rise of the start bit, there is signal on the transceiver's Rx signal output. Program 21 then continues to send the packet data, but with the blocking, collision on the network is avoided. A timer in the alternative blocking circuitry could cause this blocking to be for at least the duration of a packet, or at least until program 24 can determine collision and allow for program 20 to command program 21 to stop transmission. In this way, an interrupt 25 is not required since the transmission is merely "silenced" at the hardware level. While an interrupt allows for intelligent recovery and retransmission, collision is avoided nonetheless by this alternative.

By avoiding collision in accordance with the present invention, throughput on a network of terminal devices is greatly enhanced under circumstances where multiple terminal devices are attempting to transmit data essentially at the same time. This allows for applications in which minimal delay and/or higher throughput is required using terminals that are based on a network transceiver combined with a relatively low speed processor having program code for handling communications in accordance with a protocol.

The invention also provides for an interrupt 26 to be set, namely an interrupt triggered by the receipt of a packet for activating program 23. In the preferred embodiment, this interrupt is established prior to putting the processor into a sleep mode in which processing of program instructions stops, such that the processor 10 consumes minimal power while waiting for a packet to be received. Sleep modes are common in many processors. In some sleep modes, volatile memory is powered, while the CPU shuts down and stops executing further instructions until an interrupt wakes up the processor. Once the start bit is detected, interrupt 26 is triggered and the interrupt causes the processor to exit its sleep mode, remove the interrupt 26, begin executing program 23 to receive the incoming packet, and then control is returned to a part of program 20 that will read the packet detected and decoded by program 23. This is achieved without missing the incoming packet. Program 20 will determine the next suitable time to establish interrupt 26 and re-enter sleep mode.

The invention may also be used to measure the width of the shortest bit in a received packet and thus determine the baud rate on the network. Program 21 may be adapted to automatically adjust the baud rate of the transmission from the terminal device to the baud rate measured from the network. This measurement may be an average, or the specific baud rate used by leader or master terminal device on the network. The measurement may be performed by program 23, and its reliability is ensured when interrupt 26 immediately activates its operation. The baud rate selection can be from a pre-defined table of different baud rates and/or be dynamically computed to match the measured baud rate.

The invention claimed is:

1. A method for preventing collision in a terminal device of a data network, the terminal device having a network transceiver and a processor having a first program to cause said processor to transmit a packet of data using said network transceiver in accordance with a data transmission protocol, the method comprising:
   using a second program in said processor to listen to said data network via said network transceiver to determine, in accordance with said protocol, a time to transmit data;
   at said time, using said first program in said processor to begin transmission of a packet by sending data to a transmit signal input of said network transceiver in accordance with said protocol;
   determining a collision by detecting, at a hardware level associated with said network transceiver, a received signal on a receive signal output of said transceiver after said processor has begun transmission of said packet but before said data has been sent from said processor to said network transceiver; and
   avoiding said collision by preventing transmission of said packet in response to said detecting.

2. The method as claimed in claim 1, wherein, in response to said detecting, said first program times when transmission of said packet should have been completed and then immediately recommences transmission of said packet.

3. The method as claimed in claim 1, wherein said network transceiver circuit is an integrated circuit packaged separately from said processor.

4. The method as claimed in claim 1, wherein said processor executes other programs for said terminal device not related to said data transmission protocol.

5. The method as claimed in claim 1, wherein said data transmission protocol determines collision by detecting received data during transmission of a packet and by comparing transmitted data to received data following transmission of the packet.

6. The method as claimed in claim 5, wherein said data transmission protocol is RS-485.

7. The method as claimed in claim 1, further comprising:
   enabling a receive signal response interrupt in said processor in response to detection of a received signal in said transceiver, said receive signal response interrupt causing essentially immediate execution of a third program in said processor to detect and decode an incoming packet.

8. The method as claimed in claim 7, wherein said third program measures a width of a shortest bit of at least one packet received to determine a baud rate for transmission on said network, said first program using said determined baud rate for transmission.

9. The method as claimed in claim 7, further comprising causing said processor to enter a sleep mode in which no program instructions are executed, said receive signal response interrupt causing said processor to exit said sleep mode.

10. The method as claimed in claim 7, wherein said processor executes other programs for said terminal device not related to said data transmission protocol.

11. The method as claimed in claim 10, wherein said processor is used to execute programs in a single tasking manner.

12. The method as claimed in claim 1, wherein said detecting and said preventing include enabling an interrupt in said processor responsive to detection of a received signal on said receive signal output of said transceiver, wherein said interrupt stops said first program from transmitting said packet if said interrupt is triggered after said processor has begun transmission of said packet but before said data has been sent from said processor to said transceiver.

13. The method as claimed in claim 12, wherein said processor responds to said interrupt by checking to see if said first program executed an instruction to send said data, and if not, said first program is stopped from transmitting said packet.

14. The method as claimed in claim 13, wherein said processor executes other programs for said terminal device not related to said data transmission protocol.

15. The method as claimed in claim 12, further comprising disabling said interrupt once said data has been sent from said processor to said transmit signal input of said network transceiver.

16. The method as claimed in claim 15, wherein, when said interrupt causes said first program to be stopped from transmitting said packet, said first program times when transmission of said packet should have been completed and then immediately recommences transmission of said packet.

17. The method as claimed in claim 15, wherein said network transceiver circuit is an integrated circuit packaged separately from said processor.

18. The method as claimed in claim 15, wherein said processor executes other programs for said terminal device not related to said data transmission protocol.

19. The method as claimed in claim 12, wherein said processor executes other programs for said terminal device not related to said data transmission protocol.

20. A method for preventing collision in a terminal device of a data network, the terminal device having a network transceiver and a processor having a first program to cause said processor to transmit a packet of data using said network transceiver in accordance with a data transmission protocol, the method comprising:
   enabling an interrupt in said processor responsive to detection at a hardware level associated with said network transceiver of a received signal in said transceiver;
   using a second program in said processor to listen to said data network via said network transceiver to determine, in accordance with said protocol, a time to transmit data;
   at said time, using said first program in said processor to begin transmission of a packet by sending data to a transmit signal input of said network transceiver in accordance with said protocol;
   if said interrupt is triggered after said first program has begun transmission of said packet but before said data has been sent from said processor to said transceiver, determining a collision and causing said first program to stop transmission of said packet;

disabling said interrupt once said data has been sent from said processor to said network transceiver.

21. A method for preventing collision in a terminal device of a data network, the terminal device having a network transceiver and a processor having a first program to cause said processor to transmit a packet of data using said network transceiver in accordance with a data transmission protocol, said packet of data including a start bit and payload data, the method comprising:

using a second program in said processor to listen to said data network via said network transceiver to determine, in accordance with said protocol, a time to transmit data;

at said time, using said first program in said processor to begin transmission of a packet by sending the start bit of said packet to a transmit signal input of said network transceiver in accordance with said protocol;

determining a collision by detecting, at a hardware level associated with said network transceiver, a received signal on a receive signal output of said transceiver after said first program has begun transmission of said packet but before said start bit has been sent from said processor to said network transceiver; and avoiding said collision by preventing transmission of said packet in response to said detecting.

* * * * *